Figure 1:
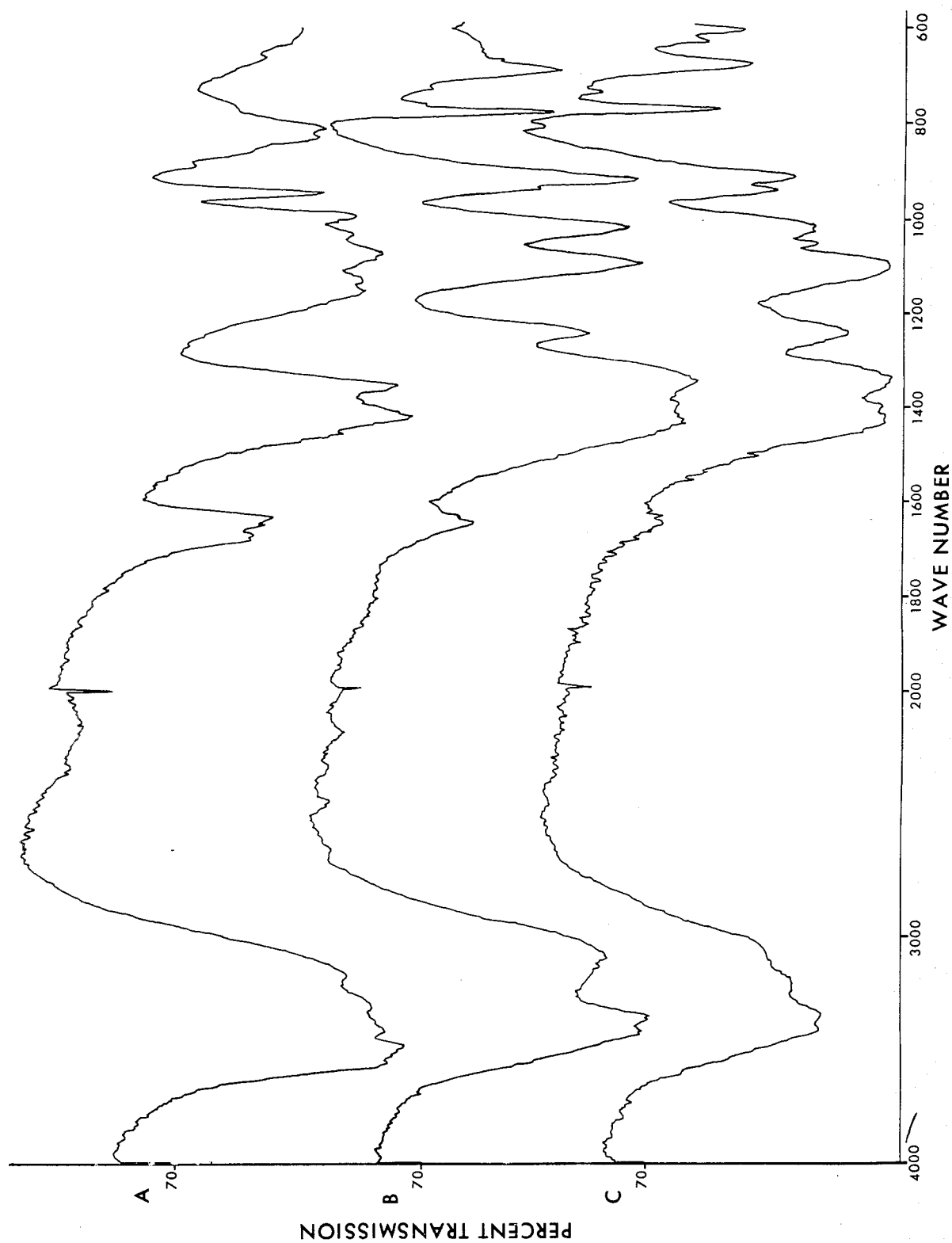

United States Patent [19]

Sallay

[11] Patent Number: 4,514,326

[45] Date of Patent: Apr. 30, 1985

[54] PERMANENT FLAME RETARDANT AND ANTI-SMOLDERING COMPOSITIONS

[76] Inventor: Stephen I. Sallay, 2918 Glencairn Dr., Fort Wayne, Ind. 46815

[21] Appl. No.: 603,340

[22] Filed: Apr. 24, 1984

Related U.S. Application Data

[63] Continuation-in-part of Ser. No. 489,176, Apr. 27, 1983, which is a continuation-in-part of Ser. No. 286,042, Jun. 22, 1981, Pat. No. 4,382,025, which is a continuation-in-part of Ser. No. 135,177, Mar. 28, 1980, abandoned, which is a continuation-in-part of Ser. No. 927,340, Jul. 24, 1978, Pat. No. 4,196,177.

[51] Int. Cl.$^3$ .............................. C09K 3/28
[52] U.S. Cl. .................. 252/602; 8/116.1; 106/15.05; 252/601; 252/607; 252/608; 423/279; 428/921
[58] Field of Search .......... 252/7, 607, 608, 601, 252/602; 106/15.05; 568/1; 423/279, 282, 283; 8/116 R; 428/921

[56] References Cited

U.S. PATENT DOCUMENTS

| | | | |
|---|---|---|---|
| 641,801 | 1/1900 | Schroeter | 252/608 |
| 1,308,577 | 7/1919 | Colvert et al. | 423/283 |
| 2,102,126 | 12/1937 | Peterson | 423/283 |
| 2,531,182 | 11/1950 | Wiseman | 423/283 |
| 2,833,623 | 5/1958 | May et al. | 423/283 |
| 3,018,163 | 1/1962 | May et al. | 423/282 |
| 3,378,381 | 4/1968 | Draganov | 252/607 |

FOREIGN PATENT DOCUMENTS

| | | | |
|---|---|---|---|
| 631217 | 4/1963 | Belgium | 423/283 |
| 766912 | 10/1971 | Belgium | 423/283 |
| 624125 | 7/1961 | Canada | 423/283 |
| 354760 | 7/1961 | Switzerland | 423/283 |
| 10361 | of 1897 | United Kingdom | 423/282 |

Primary Examiner—Stephen J. Lechert, Jr.
Assistant Examiner—Howard J. Locker
Attorney, Agent, or Firm—Bacon & Thomas

[57] ABSTRACT

When alkali metal and/or alkaline earth metal tetraborates in a water suspension are suitably treated with ammonia and sulfuric acid, sulfurdioxide or phosphoric acid, they undergo a three-step transformation resulting in a mixture of ammoniumpentaborate, the corresponding alkali metal and/or alkaline earth metal salt(s): sulfate, sulfite or hydrophosphate and ammonia (Equation 1).

Alternately, tetraborates undergo the same three-step reactions upon their treatment with equimolar amounts of ammoniumsulfate, ammoniumsulfite or diammoniumhydrogenphosphate, while the liberated ammonia can be boiled off with distilling water.

This application deals with the discovery of highly effective, permanent flame retardant compositions which also possess excellent antismoldering, noncorrosive and fungal resistant properties when properly applied on cellulosic fibers, cellulose-lignin fiber insulation materials.

20 Claims, 1 Drawing Figure

Infrared spectra of A: Borax, B: Ammoniumpentaborate and C: Crude reaction product derived from borax and ammoniumsulfate = ammoniumpentaborate plus sodiumsulfate.

Infrared spectra of A: Borax, B: Ammoniumpentaborate and C: Crude reaction product derived from borax and ammoniumsulfate = ammoniumpentaborate plus sodiumsulfate.

PERMANENT FLAME RETARDANT AND ANTI-SMOLDERING COMPOSITIONS

CROSS-REFERENCE TO RELATED APPLICATIONS

This application is a continuation-in-part of Ser. No. 489,176, filed on Apr. 27, 1983, which is a continuation-in-part of co-pending application, Ser. No. 286,042, filed on June 22, 1981, now U.S. Pat. No. 4,382,025 dated May 3, 1983, entitled "Ammoniumtriborate, an Effective New Flame Retardant", the entire disclosure of which is herein incorporated by reference, which application is a continuation-in-part of application, Ser. No. 135,177, filed on Mar. 28, 1980, entitled "Preparation of Flame Retardant Ammoniumborate Compositions" and abandoned on Nov. 4, 1981, which application is a continuation-in-part of application, Ser. No. 927,340, filed on July 24, 1978, now U.S. Pat. No. 4,196,177, printed on Apr. 1, 1980, and entitled "Process for Producing Boron Compounds from Borate Ores".

This invention relates to flame retardant compositions containing ammoniumpentaborate and inorganic sulfates, sulfites or phosphates obtained from the aqueous reaction of borates with inorganic ammonium salts. Various processes for treating borates with inorganic ammonium salts are known. One such process is described in British Pat. No. 10,361 (1897). This patent teaches that as a sole product, ammoniumtetraborate (biborate of ammonia, $(NH_4)_2B_4O_7.4H_2O$), was obtained from alkali metal and alkaline earth metal borates upon the treatment of their suspension with ammoniumsulfite.

The reaction between borax ($Na_2B_4O_7.xH_2O$) and ammoniumsulfate is described in U.S. Pat. No. 2,102,126 (1937), titled "Method for Producing Ammonia and Boric Acid". This patent describes the production of ammonia and boric acid from borax and ammoniumsulfate, as described by the following Equation PA which is set forth in this patent:

$$(NH_4)_2SO_4 + Na_2B_4O_7.10H_2O = 2NH_3 + Na_2SO_4 + 4H_3BO_3 + 5H_2O$$

Equation PA

U.S. Pat. No. 2,867,502 (1959) and a paper by Charles O. Wilson, et al., "Advances in Chemistry", Ser. No. 32, pp. 20–26 (1961), describes the reaction between ammoniumchloride and borax which led to a mixture of ammoniumpentaborate and sodiumchloride. None of the aforementioned publications and patents describe the effectiveness of ammoniumpentaborate containing compositions as flame retardants.

As described in U.S. Pat. No. 4,196,177 (1980) (of which the present application is a continuation-in-part), entitled "Process for Producing Boron Compounds from Borate Ores", tetraborate ores can be transformed in two separate operations into ammoniumpentaborate in methanolic suspension by ammoniumsulfite, ammoniumsulfite, or ammonia and sulfurdioxide or ammonia and sulfuric acid. As elaborated upon in copending application U.S. Ser. No. 286,042 filed July 22, 1981, now U.S. Pat. No. 4,382,025 (1983) and of which the present application is also a continuation-in-part, the reaction proceeds by first forming methanol stable ammoniumtriborate which can be filtered from the methanol insoluble alkalisulfite, or alkalisulfate by-product. After distilling off the methanol, ammoniumtriborate can be transformed in a separate step by water into ammoniumpentaborate. As noted in these earlier parent patents, ammoniumtriborate and its mixture with ammoniumpentaborate are fire retardants.

It has now been surprisingly and unexpectedly discovered, particularly when the teachings of the prior art are considered, that new compositions of flame retardants encompassing ammoniumpentaborate and an alkali and/or alkaline earth metal salt: sulfates, sulfites or hydrophosphates can be produced in one operation in an aqueous system, thereby obviating the necessity of utilizing methanol as described in the earlier parent patents. In addition, the flame retardant compositions of the present invention possess a unique combination of properties which include a highly effective flame retarding ability coupled with antismoldering, noncorrosive and fungal resistant properties. The overall reaction for producing the ammoniumpentaborate utilized in the composition of the present invention may be seen from the following equation:

Equation 1

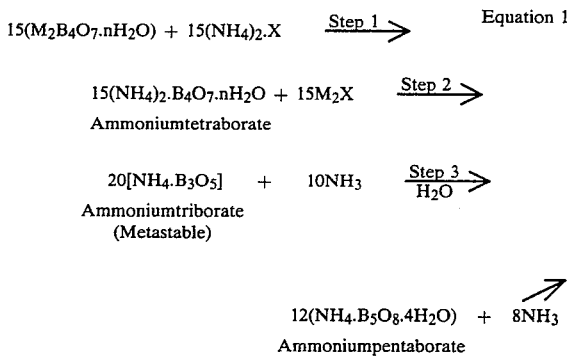

$(M = Na, K \text{ and/or } Ca; n = 0\text{–}10; \text{ e.g.: } 0, 5, 10;$
$X = SO_3^{2-}, SO_4^{2-} \text{ or } HPO_4^{2-})$ In the above Equation 1, it is to be understood that an overall reaction takes place and that Steps 1, 2 and 3 represent the proposed mechanism for the sequential transformation of metal borates in the presence of inorganic ammonium salts in water as the solvent. The first step (Step 1) represents the transformation of the metal tetraborate to the corresponding ammoniumtetraborate. The ammoniumtetraborate is transformed into ammoniumpentaborate through the metastable ammoniumtriborate (Steps 2 and 3). In the aqueous systems, ammoniumtriborate could not be isolated.

Ammoniumtriborate is stable only in methanolic solution from which it is crystallized with three molecules of crystal methanol and has an empirical formula of $NH_4.B_3O_5.3CH_3\text{-}OH$, as described in U.S. Pat. No. 4,382,025. However, model experiments verified the three-step mechanism proposed by Equation 1. Thus, reactions carried out between ammoniumsulfite, ammoniumsulfate or diammoniumhydrogenphosphate and ammoniumtetraborate in water solution led to ammoniumpentaborate. Furthermore, ammoniumtriborate, upon water treatment, also stabilized as ammoniumpentaborate, as described in U.S. Pat. No. 4,382,025 (1983). In water solution, the intermediate ammoniumtriborate is unstable and spontaneously rearranges to ammoniumpentaborate (Step 3). The above reactions verify the reaction mechanism described by Equation 1.

The derivation of the reaction mechanism set forth in Equation 1 is in part based upon the use of the infrared (IR) spectral analysis instrument. Utilizing this equipment, it is apparent that the reaction of Equation PA described in U.S. Pat. No. 2,102,126 does not adequately represent the reaction of borax and ammoniumsulfate. In fact, it has been determined that contrary to Equation PA, no boric acid is formed. Indeed, in the presence of the basic ammonia, the weakly acidic boric acid could not possibly exist in a free form. On the contrary, it has been determined that the reaction described by Equation 1 takes place (where M=sodium and X=sulfate, n=10). As a result, ammoniumpentaborate and sodiumsulfate can be formed in quantitative yield while the theoretically expected amount of ammonia gas evolves. Furthermore, the crude reaction mixture thus formed was found to be an excellent flame retardant.

In addition, as may be seen from Equation 1, ammoniumsulfite and tetraborate ores produce ammoniumpentaborate ($NH_4.B_5O_8.4H_2O$), in quantitative yield contrary to the assertion in British Pat. No. 10,361 which teaches that as a sole product, ammoniumtetraborate (biborate of ammonia, $(NH_4)_2B_4O_7.4H_2O$), was obtained from alkali metal and alkaline earth metal borates upon the treatment of their suspensions with ammoniumsulfite.

In accordance with the present invention, when equimolar amounts of tetraborates and one of the following inorganic ammonium salts: ammoniumsulfate, ammoniumsulfite or diammoniumhydrophosphate are heated in a water solution and about 60% of the theoretical ammonia content is distilled off, new and stable flame retardant compositions: ammoniumpentaborate and the corresponding alkali salt sulfate, sulfite or hydrophosphate are obtained. The same compositions are obtained after the suspension of a tetraborate in two equivalent amounts of ammonia is treated with one equivalent amount of concentrated sulfuric acid, sulfurdioxide or phosphoric acid. In case of milling, dry heating, suspending or dissolving tetraborates with the above ammonium salts, a partial formation of ammoniumpentaborate and corresponding inorganic salts are obtained with concomitant evolution of ammonia gas.

The chemical transformation, described above can be verified by infrared spectroscopy (FIG. 1) and thermometric titration. After one recrystallization of the crude solid, pure ammoniumpentaborate can be obtained (FIG. 1), which shows a 1:5 ratio between ammonia and boron content (expressed in boric acid).

The most important part of the invention is that the above described compositions are highly effective flame retardants coupled with antismoldering, noncorrosive and fungal resistant properties. These compositions can be successfully applied on cellulosic fibers, cellulose-lignin fiber insulation materials, cotton batting, carpeting, furniture padding and synthetic fibers, materials which are not subjected to laundering, or exposed only to dry cleaning.

Among the naturally occurring tetraborate ores, relatively few are ubiquitous, hence commercially useful. As examples, tincal or borax ($Na_2B_4O_7.10H_2O$), kernite or rasorite ($Na_2B_4O_7.4H_2O$), tincalconite or borax pentahydrate ($Na_2B_4O_7.5H_2O$), ulexite or boronatrocalcite ($CaNaB_5O_9.8H_2O$) and the industrially produced anhydrous borax ($Na_2B_4O_7$) may be mentioned. These are given as examples of tetraborates which may be employed in the practice of the present invention, but it is to be understood that the invention is in no way intended to be limited thereto. In fact, this invention is quite versatile and is designed to utilize any of the tetraborate ores and refined tetraborates for manufacturing new compositions, comprised by ammoniumpentaborate and an appropriate alkali and/or alkaline earth metal salt(s): sulfate, sulfite or hydrophosphate as expressed by Equation 1.

Other inorganic ammonium salts, e.g., ammoniumcarbonate, ammoniumnitrate and ammoniumfluoride were also investigated; but these salts either did not lead to the desired flame retardant compositions or resulted in a highly corrosive product.

Thus the present invention provides a solid composition having flame retardant, anti-smoldering and non-corrosive properties comprising as a first component, ammoniumpentaborate, and as a second component an alkali and/or alkaline earth metal sulfate, sulfite, hydrophosphate or mixtures thereof wherein the molecular ratios of the respective two components are between 0.4–0.8 for ammoniumpentaborate and 0.5–1.0 mole equivalent amounts for the alkali and/or alkaline earth metal salt(s).

The proceeding solid flame retardant composition may be added to water to form a 40–90% (w/v) water solution. The temperature of the aqueous solution is from 20°–80° C., preferably 40°–80° C. This aqueous solution may also contain an effective amount of a surfactant which aids the penetration of the flame retardant agent into cellulose based fibers. Preferably, the effective amount of the surfactant is from 0.1–0.6% based on the weight of surfactant per weight of final insulation product to be treated with the flame retardant.

The invention also includes a solid composition having flame retardant, anti-smoldering and noncorrosive properties comprising as a first component, ammoniumpentaborate, and as a second component an alkali and/or alkaline earth metal sulfate, sulfite, hydrophosphate or mixtures thereof wherein the molecular ratios of the respective two components are between 0.1–0.4 for ammoniumpentaborate and 0.12–0.5 mole equivalent amounts for the alkali and/or alkaline earth metal salt(s).

The invention also includes a process for manufacturing the flame retardant composition which comprises heating a water suspension of equimolar amounts of alkali metal and/or alkaline earth metal tetraborate(s) with one of the following salts: ammoniumsulfate, ammoniumsulfite or diammoniumhydrophosphate, while up to 60% of the theoretically available ammonia content is distilled off with the help of boiling water. The ammonia which is distilled off may be recycled into the next round reaction. The ammonia salt used in this reaction may be substituted by two mole equivalents of ammonia gas and one mole equivalent of one of the following acids: concentrated sulfuric acid, sulfurdioxide or phosphoric acid in a closed, stirred system, whereby the hot reaction mixture reacts with one equivalent of the tetraborate ore.

The composition comprising the two components wherein the molecular ratios of the respective two compounents are between 0.1–0.4 for ammoniumpentaborate and 0.12–0.5 mole equivalent amount for the alkali and/or alkaline earth metal salts(s) may be manufactured by heating a water suspension of equimolar amounts of alkali metal and/or alkaline earth metal tetraborate(s) with one mole of the following salts: ammoniumsulfate, ammoniumsulfite or diammoniumhydrophosphate for 10–20 minutes between 50°–100° C.

without distilling off water and all the liberated ammonia.

Another process for manufacturing this flame retardant composition comprises dissolving of equimolar amounts of alkali metal and/or alkaline earth metal tetraborate(s) with one of the following salts: ammoniumsulfate, ammoniumsulfite or diammoniumhydrophosphate, in water and using the solution for flame retardation.

Another process for manufacturing flame retardant composition of the invention comprises dissolving alkali metal and/or alkaline earth metal tetraborate(s) with one of the above described ammonium salts in water and neutralizing the liberated, corrosive ammonia with a suitable acid, such as sulfuric, sulfurous or phosphoric acid before the application on cellulose fiber. Yet another process for manufacturing the flame retardant composition of the invention comprises dry heating of equimolar amounts of alkali and/or alkaline earth metal tetraborate(s) with one of the above-mentioned ammonium salts at 100°–130° C. for 30–120 minutes.

Finally, the solid flame retardant composition comprising as a first component, ammoniumpentaborate, and as a second component an alkali and/or alkaline earth metal sulfate, sulfite, hydrophosphate or mixtures thereof wherein the molecular ratios of the respective two components are between 0.4–0.8 for ammoniumpentaborate and 0.5–1.0 mole equivalent amounts for the alkali and/or alkaline earth metal salt(s) may be manufactured by a process which comprises heating a water suspension of equimolar amounts of alkali metal and/or alkaline earth metal tetraborate(s) with one of the following salts: ammoniumsulfite or diammoniumhydrophosphate, while up to 60% of the theoretically available ammonia content is distilled off with the help of boiling water.

The invention also comprises a process for flame and smolder proofing insulation material which comprises applying in an effective amount the composition of the solid flame retardant composition after dilution to a 40–90% (w/v) preferably 50–70% solid content by hot water to cellulose or cellulose-lignin based home insulation material. Preferably, 0.1–0.6% surfactant is added to the flame retardant solution before spraying onto the cellulose based insulation material.

TEST RESULTS OF THE FLAME RETARDANT COMPOSITIONS APPLIED ON CELLULOSE FIBER

The determination of the critical radiant flux, cigarette smoldering test, corrosion test and the density of the cellulose fiber insulation materials tested with my new flame retardant compositions were determined according to the GSA Specification HH-I-515D Amendment 1, Oct. 15, 1979, except the flame spread rating. The latter was determined on a Custom Scientific Instrument, Model CS-204 two-foot tunnel (Whippany, NJ).

Table 1 summarizes the test results obtained from the flame retardant compositions described in this invention and applied on cellulose fiber insulation materials. The expression w/v% means percentage weight per unit volume.

TABLE 1

Flame test results of borax, ammoniumpentaborate and flame retardant compositions applied on cellulose insulation material.

| No. | % Content (w/w) | lb/ft$^3$ | FSR[a] | watts/cm$^{2}$[b] | CST[c], % loss |
|---|---|---|---|---|---|
| 1[d] | 18 | 2.02 | 14.1 | 0.32 | 1.4 |
| 2[e] | 18 | 2.02 | 12.5 | 0.39 | 0.3 |
| 3[e] | 16 | 1.83 ± 0.21 | 17.2 ± 1.6 | 0.2 ± 0.04 | 2.15 ± 0.30 |
| 4[f] | 15 | 1.77 | 17.0 | 0.17 | 0.2 |
| 5[g] | 15 | 1.69 ± 0.066 | 17.7 ± 1.8 | 0.173 ± 0.07 | 0.81 ± 0.37 |
| 6[h] | 12 | 1.50 | 22.0 | 0.18 | 1.3 |
| 7[i] | 15.4 | 1.68 | 34.0 (F) | 0.115 (F) | 70.2 (F) |

[a]FSR = flame spread rating
[b]These data represent the radiant flux panel results.
[c]CST = cigarette smoldering test
[d]Mixture of 12% authentic ammoniumpentaborate and 6% Na$_2$SO$_4$, sprayed in a 50% (w/v) warm water solution on the fiber.
[e]Flame retardant composition obtained from borax and ammoniumsulfate, as described in Example 1. Sprayed in a 50% (w/v) warm water solution on the fiber. Ammoniumpentaborate content of the 16% spray solution = 10.6%. Numbers shown are the mean values and standard deviations of three tests.
[f]Represents production line results versus small scale laboratory values such as experimental No. 3. Actual ammoniumpentaborate content equals 9.9%. The spray solution had a 50% solid content (w/v).
[g]Represents mean values of three production line experiments. The fire retardant spray solution had a 68% solid content (w/v).
[h]Authentic ammoniumpentaborate in a 40% (w/v) hot (60° C.) water solution sprayed on cellulose fiber.
[i]A 50% (w/v) hot water solution of borax sprayed on cellulose fiber; F = failed the test.

The test results in Table 1 have several important conclusions:

1. Test No. 4 containing 9.9% ammoniumpentaborate and 5.1% sodiumsulfate (see footnote f) exhibited a better test performance than test No. 6 which had a 12% content of pure ammoniumpentaborate.

2. The by-product of the flame retardant composition, Na$_2$SO$_4$, increased the solubility of ammoniumpentaborate. Thus, between 50°–70° C., a 60–80% (w/v) solid content of these flame retardants can be stored and sprayed.

3. Similar flame retardation, antismoldering and corrosion free properties were observed when the compositions derived from borax and ammoniumsulfite or diammoniumhydrophosphate were tested.

4. A 15.4% content of borax on cellulose fiber failed all tests.

5. The presence of sodium salt by-products (sulfate, sulfite and hydrophosphate) in the flame retardant composition did not hinder the smoldering test. The combination of ammoniumpentaborate with these inorganics unexpectedly passed all the tests including the cigarette smoldering test (Table 1) with a high level of reproducibility.

Earlier, R. J. Carter (J. Consumer Product Flammability, 4, 348–358, 1977) has observed that alkali metal halides, hydroxides, nitrates enchance smoldering due to the effect of their cations. In his paper, it is emphasized that half of the U.S. residential fire fatalities have been attributed to smoldering ignitions, mainly of cellulosic materials used in bedding and furniture. Among other salts, NaCl and NaNO$_3$ are especially conducive to smoldering. It has now been found that the metallic cation alone is not responsible for the promotion of smoldering. E.g., Na$_2$SO$_4$, Na$_2$SO$_3$ and Na$_2$HPO$_4$ did not enhance smoldering in combination with ammoniumpentaborate. Consequently, it seems that the combination of the cations and anions of inorganic salts, rather than the cations alone, are responsible for the propagation of smoldering.

CORROSION TESTS

The corrosion tests of the insulation materials, described herein, were also conducted according to the GSA Specification HH-I-515D-1, 1979. Table 2 shows the results of the new compositions and some inorganic salts.

TABLE 2

Corrosion test results of flame retardant compositions and inorganic salts applied on cellulose fiber insulation material.

| Compositions[a] | Content %, w/w | Aluminum[b] | Copper[b] | Steel[b] |
|---|---|---|---|---|
| NH$_4$B$_5$O$_8$ + Na$_2$HPO$_4$ | 18 | +++[c] | +++ | +++ |
| NH$_4$B$_5$O$_8$ + Na$_2$SO$_4$ | 18 | ++ | +++ | ++ |
| NH$_4$B$_5$O$_8$ + Na$_2$SO$_3$ | 18 | ++ | +++ | + |
| NH$_4$B$_5$O$_8$ + 2NaNO$_3$ | 18 | ++ | ++ | − |
| NH$_4$B$_5$O$_8$ + NaCl | 18 | −− | + | + |
| Inorganic salts: | | | | |
| Na$_2$HPO$_4$.12H$_2$O | 8 | ++ | ++ | +++ |
| Na$_2$SO$_4$ | 8 | ++ | ++ | +++ |
| Na$_2$SO$_3$ | 8 | ++ | ++ | ++ |
| Na$_2$NO$_3$ | 6 | +++ | ++ | −−− |
| NaCl | 6 | −−− | ++ | −− |

[a]Theoretical mole ratio of NH$_4$B$_5$O$_8$:Na$_2$.X (wherein X = HPO$_4$, SO$_4$, SO$_3$) is 0.8:1.0 and NH$_4$B$_5$O$_8$:Na$_2$.X (wherein X = NO$_3$, Cl) is 0.8:2.0.
[b]2 × 2 in$^2$/0.003" plates
[c] +++ = noncorrosive, metal remains shiny
++ = noncorrosive, metal slightly tarnished
+ = somewhat corrosive, metal definitely etched, corroded, but not perforated
− = metal perforated at one point
−− = metal perforated at several points
−−− = metal heavily perforated From the corrosion studies shown in Table 2, the following conclusions were drawn:

1. The ammoniumpentaborate-Na$_2$HPO$_4$ mixture provided a perfectly noncorrosive composition.

2. The ammoniumpentaborate-Na$_2$SO$_4$ mixture also yielded an excellent noncorrosive composition.

3. The most corrosive composition was obtained from the reaction between borax and ammoniumchloride, such as described in the earlier referred to U.S. Pat. No. 2,867,502 (1959).

4. The corrosion test also clearly showed that ammoniumpentaborate acted as a corrosion inhibitor. The sodium salts when applied alone on a comparable add-on basis were far more corrosive then when they were in combination with ammoniumpentaborate.

APPLICATION OF FLAME RETARDANT COMPOSITIONS ON FIBERS

In U.S. Pat. No. 4,382,025 (1983), it is explained that during the spraying of the flame retardant, the methanolic solution of ammoniumtriborate on fibers, methylalcohol acted as a wetting agent. Microscopic studies with methanol soluble dye showed that the methanolic solution of the flame retardant evenly penetrated the cellulose fibers. Now that in this invention methanol is changed by water, it was important to replace its beneficial property. As a result of a systematic study, it was found that suitable surfactants, wetting agents such as IGEPAL®CO-630, NEKAL®NF and GAFTERGE®DP-100 (marketed by GAF, New York, NY 10020) and other similar products significantly improved the surface spread and the penetration of the flame retardant compositions into the cellulose fiber. The use of 0.1–0.6 weight percent amount of surfactant, calculated in the weight of the base fiber, was found to be sufficient.

The discovery that ammoniumpentaborate can be quantitatively obtained from tetraborate ores in water instead of methanol, as it is described in U.S. Pat. No. 4,382,625 (1983), eliminated any health hazard, flammability of the solvent and provided a simplified and more economical procedure for the production of new flame retardant compositions. In addition, the flame retardant compositions of the invention provided better test results on a comparable content basis than that of ammoniumpentaborate, a mixture of borax and boric acid or boric acid alone.

The role of the by-product alkali salts: sulfate, sulfite or hydrophosphate is significant. They and the residual amounts of starting materials increase the solubility of ammoniumpentaborate in water. These salts help to provide stable flame retardant solutions at moderate temperature (below 80°, e.g.: 50°–80° C.) with high solid content (between 30–90%, preferably 60–90% w/v). Thus, the composition can be readily sprayed on the carriers, such as cellulose based materials, without the danger of clogging the spray nozzles. Similar concentration of this spraying technology cannot be performed by pure ammoniumpentaborate. In addition, the wet application of the flame retardant increases the penetration of the flame retardants into the fiber. Moreover, wet application immensely decreases the dust problem which exists during the traditional dry application of flame retarding chemicals.

The flame retardation and antismoldering properties of the compositions of the present invention can be further enhanced by a suitable surfactant. Thus, the added surfactant (0.1–0.6% w/w) greatly helps to penetrate and spread the concentrated water solution of the new fire retardant compositions into the hydrophobic fibers. The flame retardant composition can be also applied in a dry powder form on cellulosic, cellulose-lignin fiber insulation materials, cotton batting, carpeting, furniture padding, synthetic fibers and plastics which are not subjected to laundering, or exposed only to dry cleaning.

The technology described in this invention creates no waste problem with its added advantage of not polluting the environment. The ammonia gas which is liberated during the process of this invention (Equation 1) is recycled into a second reactor. The technology which is described in Example 3 requires the addition of concentrated sulfuric acid. The highly exothermic reaction which takes place secures most of the energy needed for the transformation of borax into ammoniumpentaborate. Thus, the process includes a great energy saving potential.

Finally, it is important to note that the flame retardant compositions described in this invention represent permanent, nonvolatile, nonhygroscopic, alkali and heat stable chemicals, such as ammoniumpentaborate and the accompanying inorganic salts.

The following examples are given as illustrating the present invention but are not to be considered as limiting the same.

EXAMPLE 1

A stirred mixture of 73.5 kg borax.pentahydrate and 33.4 kg ammoniumsulfate in 45 liters of water was heated to its boiling point. After 30 liters of water, carrying the liberated ammonia, was distilled off, about 95 liters of syrup remained in the reaction vessel. This residue was comprised by ammoniumpentaborate and sodiumsulfate. During the above process, about 85–100% of the theoretical amount of ammonia was distilled over into a second reactor. After the distillation was completed, the thick residue was diluted with 55 liters of warm water. Finally, 1.4 kg of a suitable surfactant, e.g., GAFTERGE ® (GAF, New York, NY) was added to the hot solution of the flame retardant composition before spraying it onto 550 kg of cellulose fiber insulation material.

As an alternative route, the thick syrup which is left behind after the distillation phase can be treated with surfactant and stored and/or delivered to other plants. After reconstituting the flame retardant composition with hot water, it can be used in the above described spraying process.

EXAMPLE 2

Following the experimental conditions of Example 1, but distillating off practically all of the water of the reaction mixture, upon cooling, a solid mixture of the flame retardant composition was obtained. The IR spectrum of the crude solid is shown by FIG. 1C. The solid can be milled and stored as a stable flame retardant composition which can be dissolved in hot water containing an adequate amount of surfactant and applied to the material to be treated.

EXAMPLE 3

Following the conditions of Example 1, but substituting ammoniumsulfate with ammonia gas and concentrated sulfuric acid was used to obtain the flame retardant. More specifically, first suspending borax in ammoniumhydroxide and rapidly adding concentrated sulfuric acid to the mixture in a well stirred and closed reactor, an exothermic, instant formation of ammoniumsulfate and a concomitant transformation of borax to ammoniumpentaborate ensued.

A reversed addition of reagents, first sulfuric acid followed by ammonia or ammoniumhydroxide led to the same flame retardant composition. The heat generated in both cases was adequate to bring the reaction mixture to its boiling point. After opening the reactor's valve, the superheated reaction mixture partly distilled over the liberated ammonia along with water into the second reaction vessel.

The same fire retardant composition was obtained by first introducing two mole equivalents of ammonia gas into water, followed by one mole equivalent of concentrated sulfuric acid. The hot ammoniumsulfate solution thus formed was then treated with one equimolar amount of borax in one batch. The liberated ammonia was distilled over as described in Example 1.

The cooled and solidified reaction mixtures of the two modifications provided the same analyses and IR spectra (FIG. 1C). The ammonia/boric acid ratio of the crude samples verified the completion of the borax to ammoniumpentaborate transformation.

EXAMPLE 4

Following the procedures of Examples 1–3, but substituting ammoniumsulfate or ammonia gas and sulfuric acid with ammoniumsulfite, diammoniumhydrophosphate, or alternately with ammonia gas plus sulfurdioxide or ammonia gas and phosphoric acid, flame retardants composed of ammoniumpentaborate and sodiumsulfite or ammoniumpentaborate and disodiumhydrophosphate, respectively, are obtained.

EXAMPLE 5

Following the procedures of Examples 1–3, but substituting ammoniumsulfate with ammoniumnitrate, a mixture of ammoniumpentaborate and sodiumnitrate was obtained. However, the crude product did fail the corrosion test (Table 2).

EXAMPLE 6

Following the procedure described in Examples 1–3, but substituting borax pentahydrate with equimolar amounts of other tetraborate ores, such as tincal, kernite or mixed tetraborate ores, e.g., ulexite, the desired flame retardant composition was obtained.

In the case of ulexite, however, the water insoluble or poorly soluble calcium salt by-products: gypsum, calciumsulfite or calciumphosphate were filtered after the distillation of the ammonia-water mixture is completed.

EXAMPLE 7

A dry mixture of borax pentahydrate (291.3 g) and ammoniumsulfate (132.1 g) were stirred and heated in a 1 liter round-bottom flask, equipped with a mechanical stirrer, reflux condenser and nitrogen gas-inlet. The well stirred mixture was heated to 100°–130° C. between 1–3 hours. The evolved ammonia gas was purged by nitrogen and captured under 1.0N sulfuric acid. (Th. yield 1.2 mole; yield 0.7 mole=58.3%.)

During the transformation, the condenser retained the refluxing crystal water of borax. At the end of the reaction, the product solidified. One recrystallization from water yielded ammoniumpentaborate in good yield.

EXAMPLE 8

A dry mixture of borax pentahydrate (145.6 g) and ammoniumsulfate (66.1 g) were stirred while heated in an open vessel between 120°–200° C. Vigorous ammonia and water evolution took place (these by-products were trapped). The original volume of the reactants increased 6.6-fold during the reaction. The crude, solid mixture provided ammoniumpentaborate upon recrystallization from water.

EXAMPLE 9

Borax pentahydrate (191.3 g) and ammoniumsulfate (132.1 g) were stirred and dissolved in warm (40°–100° C.) water (400–1,500 ml). The heating can be applied between 30–120 minutes. During the process, ammonia evolved and partial transformation of the tetraborate into ammoniumpentaborate and sodiumsulfate took place. The solution thus obtained can be sprayed or soaked on cellulosic or cellulose-lignin fibers rendering them flame retardant. Because of the partial transformation of the starting materials, the chemical load on fibers had to be significantly increased (>20% w/w).

EXAMPLE 10

Following the experimental conditions of Examples 7–9, but substituting borax pentahydrate with equimolar amounts of other tetraborates, such as borax decahydrate, tincal, kernite or mixed tetraborate ores, e.g., ulexite, the desired flame retardant compositions were obtained.

EXAMPLE 11

Following the experimental conditions of Examples 7–9, but substituting ammoniumsulfate with equimolar amounts of ammoniumsulfite or diammoniumhydrophosphate, the desired flame retardant compositions were obtained.

EXAMPLE 12

Following the experimental conditions of Example 10, but substituting ammoniumsulfate with equimolar amounts of ammoniumsulfite or diammoniumhydrophosphate, the desired flame retardant compositions were obtained.

EXAMPLE 13

The amount of ammonia evolution during the transformation of the tetraborate ores with inorganic ammonium salts applied in Examples 1, 4 and 5 was studied. During the distillation phase of the technology, the ammonia-water (ammoniumhydroxide) mixture was captured under 2N sulfuric acid. The following ammonia yields were observed: borax and ammoniumsulfate>90%; borax and diammoniumhydrophosphate~100%; borax and ammoniumsulfite>90%; borax and ammoniumnitrate>90%.

Although some of the ammonia titrations showed lower than 100% yields, the IR and thermometric titrations of the crude, solid products have shown complete transformations of borax into ammoniumpentaborate. Thus, it was concluded that the below 100% yield of ammonia simply indicated an incomplete distillation rather than the lack of a quantitative reaction.

EXAMPLE 14

Application of the warm spray of the flame retardant compositions of Examples 1–4 on cellulose fiber insulation material reproducibly passed the radiant flux panel, cigarette smoldering, flame spread and corrosion tests, as shown in Tables 1 and 2. The optimum content was between 15–16% in which ammoniumpentaborate represents 9.9–10.6% (w/w). This ammoniumpentaborate content is representative of the case where the by-product is sodiumsulfate.

EXAMPLE 15

Application of the spray solution of flame retardant compositions of Examples 7–12 on cellulose fiber insulation material passed the radiant flux panel, cigarette smoldering, flame spread and corrosion tests. But, in contrast with Example 14, the optimum add-on of chemicals had to be significantly higher: over 20%.

EXAMPLE 16

A suspension of 13.1 g (0.05 mole) ammoniumtetraborate (U.S. Borax) and 6.6 g (0.05 mole) of ammoniumsulfate in 25 ml of water was stirred, boiled and slowly distilled until a thick syrup remained in the flask. The hot syrup was poured onto a paper sheet on which it quickly solidified. The ammonia gas which evolved during the distillation was captured in 100 ml 1N sulfuric acid. The titration verified the evolution of 0.029 mole ammonia which corresponds to a 96.7% yield (Th. y. 0.03 mole).

The above solid, crude product was recrystallized from water. The shiny, stout crystals had superimposable IR spectrum with the authentic ammoniumpentaborate (FIG. 1B). Thermometric titration analysis of the recrystallized ammoniumpentaborate has shown a boric acid:ammonia ratio of 1:4.99, indicating an analytical grade transformation product.

This reaction verified that borax first changes to ammoniumtetraborate which then with the liberation of ammonia undergoes stabilization into ammoniumpentaborate. Coupled with this observation, as it is described in U.S. Pat. No. 4,382,025 (1983), ammoniumtriborate, a water unstable intermediate, also develops from ammoniumtetraborate and is readily transformed into ammoniumpentaborate. Thus, this model study clearly demonstrates the mechanism described in Equation 1.

I claim:

1. A solid composition having flame retardant, antismoldering and noncorrosive properties comprising as a first component, ammoniumpentaborate, and as a second component an alkali and/or alkaline earth metal sulfate, sulfite, hydrophosphate or mixtures thereof wherein the molecular ratios of the respective two components are between 0.4–0.8 for ammoniumpentaborate and 0.5–1.0 mole equivalent amounts for the alkali and/or alkaline earth metal salt(s).

2. The composition of claim 1 wherein the flame retardant composition is in a 40–90% (weight/volume) water solution.

3. The composition of claim 2 containing an effective amount of a surfactant which aids the penetration of the flame retardant agent into cellulose based fibers.

4. The composition of claim 3 wherein the effective amount of the surfactant is from 0.1–0.6% based on the weight of surfactant per weight of final insulation product.

5. The composition of claim 2 wherein the temperature of the water solution is 20°–80° C.

6. A process for manufacturing the flame retardant composition of claim 1 which comprises heating a water suspension of equimolar amounts of alkali metal and/or alkaline earth metal tetraborate(s) with one of the following salts: ammoniumsulfate, ammoniumsulfite or diammoniumhydrophosphate, while up to 60% of the theoretically available ammonia content is distilled off with the help of boiling water.

7. The process of claim 6 wherein the ammonia distilled off is recycled into the next round reaction.

8. The process of claim 6 wherein the ammonia salt is substituted by two mole equivalents of ammonia gas and one mole equivalent of one of the following acids: concentrated sulfuric acid, sulfurdioxide or phosphoric acid is a closed, stirred system, whereby the hot reaction mixture reacts with one equivalent tetraborate ore.

9. A process for flame and smolder proofing insulation material which comprises applying in an effective amount the composition of claim 1 after dilution to a 40–90% (weight/volume) solid content by hot water to cellulose or cellulose-lignin based home insulation material.

10. The process of claim 9 wherein 0.1–0.6% surfactant is added to the flame retardant solution before spraying onto the cellulose based insulation material.

11. The process of claim 9 wherein the composition of claim 1 is dissolved in hot water to a 50–70% (weight/volume) spray solution and then applied to the insulation material.

12. The composition of claim 2 wherein the temperature of the water solution is 40°–80° C.

13. A process for manufacturing the flame retardant composition of claim 1 which comprises heating a water suspension of equimolar amounts of alkali metal and/or alkaline earth metal tetraborate(s) with one of the following salts: ammoniumsulfite or diammoniumhydrophosphate, while up to 60% of the theoretically available ammonia content is distilled off with the help of boiling water.

14. A fiber having flame retardant and antismoldering properties containing the composition of claim 1 in an effective amount.

15. The insulation material obtained by the process of claim 9.

16. A solid composition having flame retardant, antismoldering and noncorrosive properties comprising as a first component, ammoniumpentaborate, and as a second component an alkali and/or alkaline earth metal sulfate, sulfite, hydrophosphate or mixtures thereof wherein the molecular ratios of the respective two components are between 0.1–0.4 for ammoniumpentaborate and 0.12–0.5 mole equivalent amounts for the alkali and/or alkaline earth metal salt(s).

17. The process for manufacturing the flame retardant composition of claim 16 which comprises heating a water suspension of equimolar amounts of alkali metal and/or alkaline earth metal tetraborate(s) with one mole of the following salts: ammoniumsulfate, ammoniumsulfite or diammoniumhydrophosphate for 10–120 minutes between 50°–100° C. without distilling off water and all the liberated ammonia.

18. The process for manufacturing the flame retardant composition of claim 16 which comprises dissolving of equimolar amounts of alkali metal and/or alkaline earth metal tetraborate(s) with one of the salts of claim 17 in water and using the solution for flame retardation.

19. The process for manufacturing flame retardant composition of claim 16 which comprises dissolving alkali metal and/or alkaline earth metal tetraborate(s) with one of the ammonium salts of claim 17 in water and neutralizing the liberated, corrosive ammonia with a suitable acid, such as sulfuric, sulfurous or phosphoric acid before the application on cellulose fiber.

20. The process for manufacturing the flame retardant composition of claim 16 which comprises dry heating of equimolar amounts of alkali and/or alkaline earth metal tetraborate(s) with one of the ammonium salts of claim 17 at 100°–130° C. for 30–120 minutes.

* * * * *